May 7, 1957  E. J. OPITZ  2,791,094
PRESSURE BACKUP SYSTEM FOR PRESS
Filed Oct. 26, 1951  2 Sheets-Sheet 2
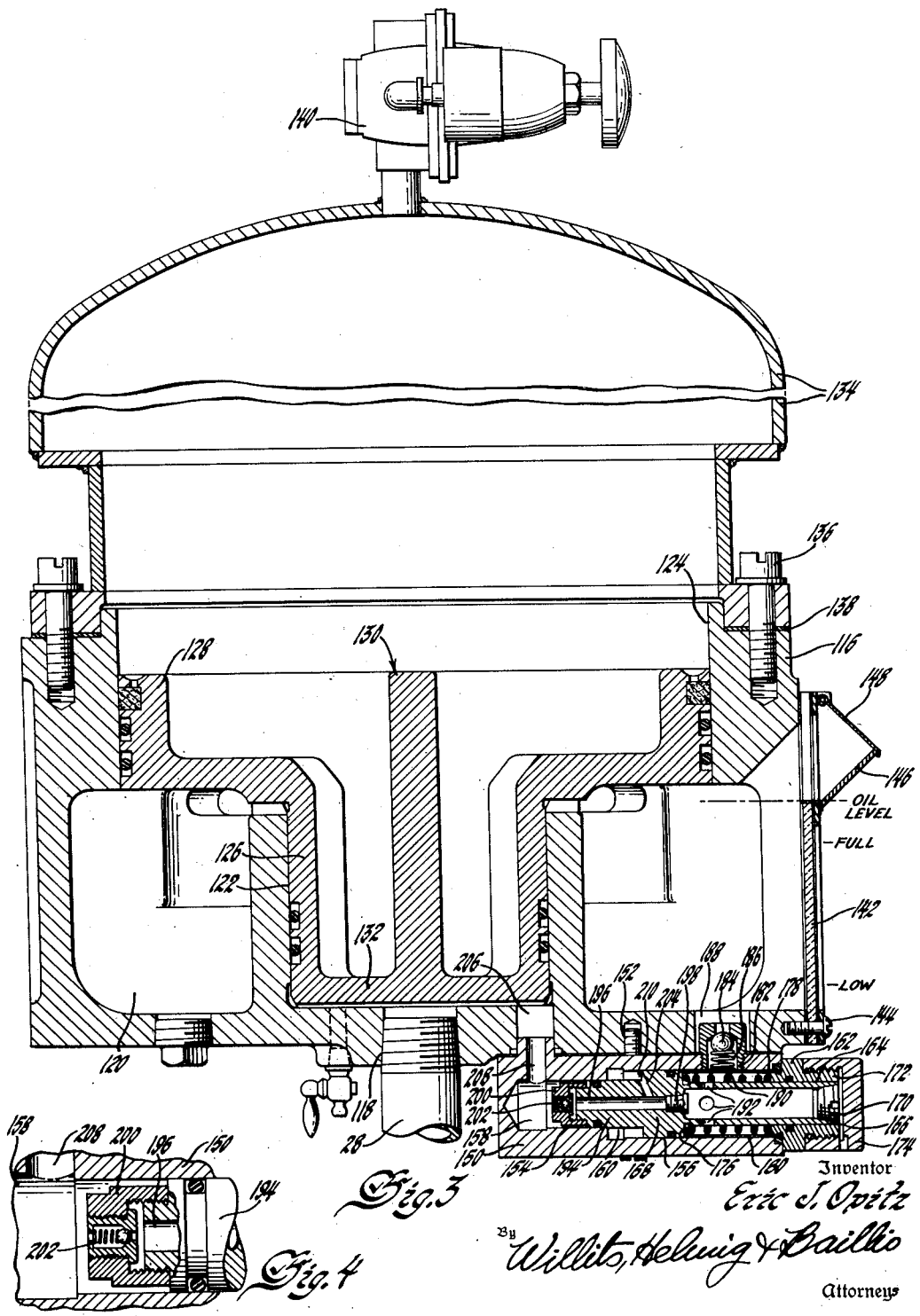

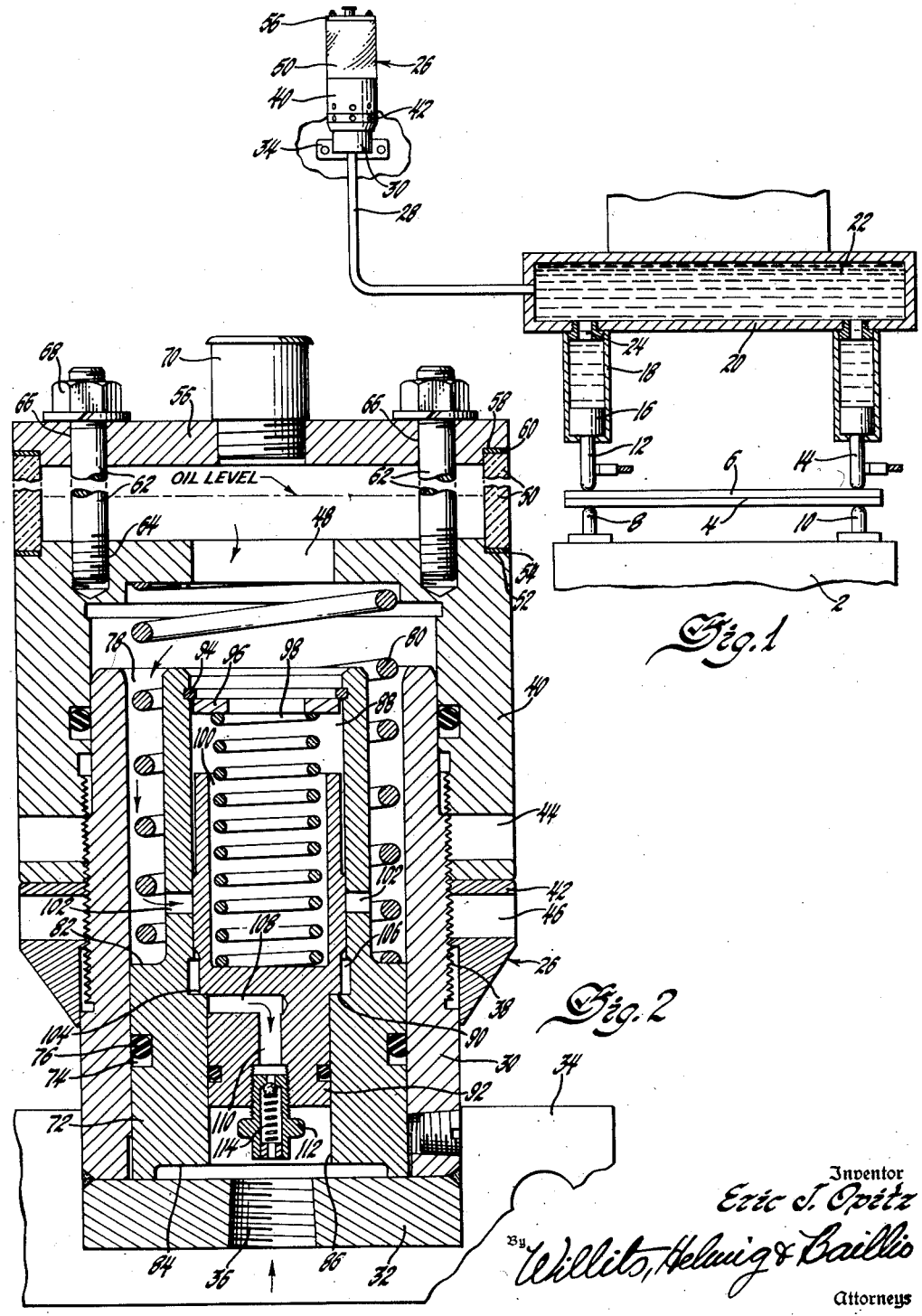

United States Patent Office 2,791,094
Patented May 7, 1957

2,791,094

PRESSURE BACKUP SYSTEM FOR PRESS

Eric J. Opitz, Franklin, Mich., assignor to General Motors Corporation, Detroit, Mich., a corporation of Delaware Application October 26, 1951, Serial No. 253,370

8 Claims. (Cl. 60—54.5)

This invention relates to systems in which pressure is applied to work for the performance of certain operations and more particularly to pressure systems in which a fluid is used for applying or resisting clamping forces.

In modern production many steps of assembly require the holding of parts tightly in a certain relation to perform assembly or machining operations thereon. In certain instances the clamping pressure applied is critical and should be maintained substantially the same on repeated operations of a machine for mass production. As exemplary of such a case and in no wise limiting as my invention has numerous applications, is that of automatic multiple spot welding machines. In these machines the work is placed on a platen that is moved upwardly to force it against a plurality of spaced welding electrodes which are movable and are backed up by some pressure means. This latter may be spring pressure or it may be fluid pressure. The use of fluid pressure for backing is more desirable as it is more easily equalized so that each electrode is pressed against the work with the same force. A common fluid supply may be provided for a plurality of electrodes in a bank and thus each presses against the work with the force of the fluid pressure supply and all are equalized.

In welding a certain predetermined pressure must be applied to the electrode at each weld in order to form consistent good welds. If the pressure becomes less the character of the weld performed will change and may even fail to develop during the application of heat. If there is any leakage of the fluid from the pressure system the pressure will be reduced and in automatic welding machines may drop below the pressure necessary for the making of satisfactory welds for some time before being discovered by the operator.

It is an object of my invention to provide automatic means for maintaining the amount of fluid constant in a closed system subject to pressure variations.

It is a further object of my invention to provide means to replace fluid which may leak from a closed system subject to pressure variations.

It is a still further object of my invention to replace fluid which may have leaked from a closed system subject to pressure variations during predetermined portions of such cyclic pressure change.

With the above and other objects in view my invention will be best understood by reference to the following specification and claims and the illustrations in the accompanying drawings, in which:

Figure 1 is a diagrammatic showing of a closed pressure system utilizing my invention.

Figure 2 is a vertical sectional view of a fluid supply and injector to replace lost fluid in a closed system.

Figure 3 is a vertical sectional view of a modified form of fluid supply and injector to replace lost fluid which embodies my invention; and Figure 4 is an enlarged sectional detail view of the check valve through which fluid is applied in Figure 3.

Referring now more particularly to Figure 1, there is shown at 2 the lower movable platen of a welding machine. The work to be welded is represented by two sheets 4 and 6 which are placed upon lower electrodes 8 and 10 secured to the platen. Upper electrodes 12 and 14 are mounted in alignment with lower electrodes 8 and 10 respectively and when current is applied a weld is formed between each upper and lower electrode. The upper electrodes are each mounted on a piston 16 in a cylinder 18 which is mounted on a supply chamber 20 carried by the frame of the welder. The supply chamber 20 is filled with a fluid 22 which may flow into the cylinders 18 through openings 24.

Thus as the lower platen is raised, it carries the work up into contact with the upper electrodes forcing them upwardly to compress the fluid in the cylinders 18 and applying a predetermined pressure to the electrodes. If fluid escapes from any part of this system, the pressure on the electrodes for a given position of the work will be reduced. Any reduction of this pressure will affect the weld and if it drops any appreciable amount the weld may be very poor. A small leak is hard to detect and in a production machine many parts may be introduced to the welder and poor welds formed before the operator becomes aware that anything is wrong.

There is therefore provided an automatic injector means such as illustrated at 26 having a separate emergency supply of fluid which is connected to the main supply chamber 20 by fluid line 28. The detail of this apparatus is best shown in Figure 2. A main cylindrical body 30 has a circular closure member 32 secured to its lower end by welding and also carries a mounting bracket 34 fixed thereto. The mounting bracket may in turn be bolted to a suitable part of the machine. The closure member 32 has a central threaded aperture 36 to which the fluid line 28 is secured. The exterior surface of the main cylindrical body 30 is threaded as at 38 over approximately one-third of its length and a cap member 40 is screwed onto the cylindrical body to complete the main enclosure. A lock nut 42 is provided to lock the cap member in its desired axial position. Both the cap member 40 and lock nut 42 are provided with peripherally spaced holes 44 and 46 for the insertion of rods or wrenches to turn and tighten the assembly.

The upper end of the cap 40 has a central aperture 48 through which fluid may be fed to the injector. A fluid reservoir is provided on top of the cap 40 by a cylindrical member 50 of the same diameter as the cap member 40 and fitting into a peripheral groove 52 in the latter and sealed by a washer 54. The upper end of the cylindrical tank member 50 is closed by a disc 56 having a similar peripheral grove 58 and a sealing washer 60. The reservoir is assembled to the cap 40 by retaining rods 62 having both ends threaded, the lower ends being threaded into tapped opennigs 64 in the cap 40 and their upper ends extending through openings 66 in the disc 56 and having clamping nuts 68 applied to the outer ends. The cylindrical member 50 may be formed of transparent material such as glass so that the supply of fluid may be observed. A filler cap 70 is provided in the disc 56 through which additional fluid may be introduced as needed.

Within the housing provided by the cylindrical member 30 and the cap 40 there is a piston 72 having a peripheral grove 74 within which a packing ring 76 is located. The upper half of the piston is of smaller diameter than the lower and forms an annular chamber 78 with the body member 30. A coiled spring 80 is located in this chamber 78 and bears against a shoulder 82 on the piston formed by the change in diameter and against the inner surface of the cap 40 to spring load the piston downwardly. The face of the piston 72 is counterbored at 84 to provide a chamber adjacent the end plate 32. The central portion of the piston is bored out to two different diameters. The lower portion has a central opening 86 of smaller diameter and the upper portion an opening 88 of larger diameter, forming a shoulder 90 between the two.

A second piston 92 is mounted within these two bores having approximately the same outside diameter as the inside diameter of the openings and slidable therein. The shoulder 90 acts as a stop for downward movement of the piston 92. A retainer ring 94 snaps into a groove adjacent the upper end of bore 88 of piston 72 and holds washer 96 against one end of a coil spring 98 which is carried in a cavity 100 in the upper end of piston 92 and biases the latter downwardly with respect to piston 72.

The fluid from the reservoir flows down through opening 48 in the cap 40 to fill the annular chamber 78. Adjacent the lower end of this chamber the wall of the piston 72 is provided with a plurality of radial ports 102 to provide inward flow of fluid at this point when the position of the inner piston uncovers or partially uncovers the ports. A peripheral groove 104 is cut in the exterior surface of the side of piston 92 adjacent the change in diameter to provide an annular chamber 106. A radial duct 108 is cut into the piston 92 just below this chamber. The duct 108 is cut into the center of the piston and joined to a central duct 110 which extends axially through to the end of the piston. The outer or lower end of this duct is counterbored and threaded to receive a ball check valve 112 which is spring biased by spring 114 toward duct 110. Thus when the piston 92 moves upward to uncover the ports 102 fluid may flow into annular chamber 106 to be forced out through ducts 108 and 110 and ball check valve 112 when the piston descends.

The injector operates in the following manner assuming that it is assembled and connected to the supply chamber of fluid backing means for a welder which is filled with fluid, the reservoir of the injector having ample fluid to compensate for any lost by the main system. The work is placed on the lower platen of the welder and the platen raised by machine operation to move the work up again the upper movable electrodes 12 and 14 which tend to move up compressing the fluid 22 until a certain loading is obtained. If no fluid leaks from the system then each time the platen rises to a given point, the same pressure will be applied to the electrodes with the same work. The increased pressure in the chamber 20 and the displaced fluid therefrom is applied to the injector apparatus through the connection via line 28 and introduced to the heads of both pistons 72 and 92. The spring pressure provided by spring 80 holding piston 72 is, however, much stronger than that provided by spring 98 and therefore the injector piston 92 will be the first to move upwardly upon a rise in fluid pressure. As the pressure in the system rises due to upward movement of the electrodes 12 and 14, the injector piston 92 will rise, overcoming the bias of spring 98. As it reaches its uppermost position the ports 102 will be uncovered, permitting fluid to flow into the charging chamber 106 and fill that as well as ducts 108 and 110 down to the check valve 112. Further increase in pressure causes the main piston 72 and the injector piston 92 to rise as a unit against the pressure of spring 80.

The proper pressure for welding having been achieved and the welding operation having taken place, the pressure falls. The main piston 72 and injector piston 92 move downwardly as a unit, forcing the displaced fluid back into the chamber 22. After the piston 72 reaches its normal position, further pressure decrease will permit the injector piston 92 to move downwardly under pressure of spring 98. Piston 92 will then close ports 102 trapping fluid in the charging chamber 106 under pressure of spring 98. If a pressure drop has occurred in the main system due to leakage, fluid under pressure of spring 98 will be forced through the ball check valve 112 and into the supply chamber 20 to replace any fluid which has escaped. If no pressure drop has occurred then the injector piston will remain in charged position ready upon any decrease in main system pressure to force fluid in and replace that lost. Similar action occurs for each welding cycle depending upon the position of the injector piston which may remain in charged position with respect to the main piston as long as no leakage occurs.

A modified form of my invention is shown in Figure 3 and 4. Only the auxiliary storage and injector means are shown in these figures as it is assumed that this means would be connected to the main fluid supply through the same line 28. A substantially cylindrical casing 116 is provided having a central threaded aperture 118 in its lower surface to which the line 28 is attached. A toroidal storage cavity 120 is provided in the lower portion of the casing for the storage of extra fluid. A central opening 122 extending from the base of the casing to the top of the toroidal cavity in conjunction with the larger cylindrical interior surface 124 of the upper portion of the casing act as bearing surfaces for the two different diametral sections 126 and 128 of a dual diameter piston 130. The piston head 132 forms a chamber with the base of the casing into which fluid is forced through line 28 and which forces the piston upwardly.

A semi-spherical housing 134 is secured to the top of the housing by machine screws 136, a sealing ring 138 being provided to seal the joint between the housing and casing. A valve 140 is secured to the top of the housing 134 and connected to a supply line for air under pressure which in this instance provides the backing pressure for the piston and biases the same downwardly. The air pressure is applied over a relatively large surface of the piston in proportion to the area in contact with the fluid (the head of the piston). Thus as the pressure in the supply chamber for the welders is increased and the fluid therein displaced it will be fed in through the line 28 to force piston 130 upwardly and compress the air above the piston in the spherical housing.

An opening in one side of the casing is partially covered by a transparent plate of glass 142 held in place by suitable machine screws 144 so that the level of oil in the storage area can be observed. The remainder of the opening is covered by a filler spout 146 and a pivoted cover 148 therefor through which additional fluid may be added as needed. All of these joints are properly sealed by gaskets to prevent leakage. This supply of fluid is used to add to the main supply in case of loss or leakage.

The injector unit in this case consists of a main housing 150 which is secured to the lower face of the casing 116 by machine screws 152. This housing has a central bore extending substantially through the same and including sections of different diameter, the innermost section 154 being of smaller diameter than section 156 to the right thereof as shown in Figure 3. Axially short sections 158 and 160 respectively are formed of slightly larger diameter than the main portions of sections 154 and 156 at their innermost ends. A bearing member 162 is secured in the end of bore 156 by suitable means (not shown) and has a circular opening 164 which acts as a bearing surface for the tubular section 166 of the injector piston 168, which tubular section extends through said opening. The outer end of the tubular section is internally threaded and a plug 170 screwed therein to cap the closure. The bearing member has an exteriorly threaded boss 172 adjacent the opening 164 and a cap 174 is applied thereto to cover the same. The main body of the piston 168 is of larger diameter than the tubular portion 166 and fits snugly within bore 156, thus forming a shoulder 176 and an annular chamber around the tubular member. A coil spring 178 is mounted in the annular chamber and biases the piston 168 to the left as shown in Figure 3 since it bears against the shoulder 176 and the inner surface of the closure member 162. A sleeve 180 fits inside the bore 156 and prevents the piston from moving to the right beyond a certain limit.

A threaded opening 182 in the top of housing 150 carries a ball check valve 184 biased upwardly by spring 186. An aligned opening 188 in the bottom of the main housing interconnects the first opening 182 with the storage chamber 120 and it is within this opening that the check valve is mounted. A further opening 190 in sleeve 180 permits fluid to flow into the annular chamber around the tubular extension 166 and a series of peripherally spaced openings 192 in the tubular section 166 permit said fluid to flow into the same.

The left-hand portion 194 of the piston is smaller than the central portion and fits within bore 154. An axial bore 196 extends through the piston connecting the space within the tubular member with the outer end. A ball check valve 198 is mounted in the end of the bore 196 adjacent the tubular section 166 and the ball is spring biased to the right. A cap member 200 is threaded onto the left-hand end of the piston and carries a ball check valve 202, also biased toward the right. Both valves 198 and 202 are the same and best shown in detail in Figure 4. A substantially radial channel 204 extends from the shoulder between piston sections 168 and 194 to the axial bore 196, thus connecting the annular chamber 160 to the bore 196.

The chamber formed by the head 132 of piston 130 and the base of the main housing is connected to the chamber formed by bore 158 through an opening 206 in the base of the main housing and a passage 208 in the injector housing 150. Through this series of passages fluid will flow from the main supply chamber 120 to the chamber formed under the head of the piston as required, as will now be described in detail.

The functioning of the welder as in the previous instance causes fluid to be displaced from the main supply chamber 20 through line 28 and to raise piston 130 against the air pressure in dome 134 as the work is clamped between the welding electrodes. At the completion of the weld and the removal of electrode pressure the piston 130 will descend and force the fluid back through line 28 to the main reservoir 20. While the pressure on the fluid in this system increases during the clamping and holding of the work it has a normal operating pressure at all times. This pressure is approximately balanced by the pressure of the spring 178 on the piston 168.

The piston is shown in Figure 3 in its fully charged position with the charging chamber 160 full of fluid and ready to discharge into chamber 158 if the pressure in the main system falls due to a leak. If the main system maintains at all times a pressure great enough to hold the injector piston in this position, no extra oil will be needed and none added. However, if a leak occurs and at the end of a welding cycle the pressure in the main system falls below its normal value, then spring 178 forces piston 168 to the left. Shoulder 210 compresses the fluid in charging chamber 160, forcing it through passage 204, bore 196 and ball check valve 202, which is opened by increased pressure on the right, into chamber 158 and thence up to the main piston 130 to replace the lost fluid. At this same time ball check valve 198 is maintained closed by high pressure to the left and a suction is created within the tubular section 166 to draw down fluid through check valve 184 to fill this space from the storage area 120.

After the piston 168 has completed its movement to the left under the influence of spring 178 to inject fluid in the main system to replace that lost, upon the next welding cycle the pressure in the main system will rise, overcoming the force of the spring 178 and forcing the piston 168 back toward the right as seen in Figure 3. This high pressure to the left of the injector piston will close ball check valve 202. This movement of the injector piston to the right tends to compress the fluid within the tubular portion 166 which closes the ball check valve 184 and opens ball check valve 198, forcing the fluid from the tubular chamber into passages 196 and 204 to refill the charging chamber 160 and place the system in readiness to supply more extra fluid if the pressure in the main system falls below that value which can be overcome by the piston drive spring 178.

Either of these systems will continue for some time to supply extra fluid to the main reservoir to maintain pressure to produce proper welds in the event of a leakage of backing fluid. After a considerable amount of fluid has been lost from the system it would undoubtedly be noticed by the operator and the system repaired without in the meantime having a plurality of parts welded in an unsatisfactory manner and of unknown worth.

I claim:

1. In a closed fluid system having initial pressure for providing backing pressure for movable electrodes mounted to contact said closed fluid and to which external pressure is periodically applied, primary movable piston means coupled to said system to accommodate for fluid movement in the fluid system under said applied pressure, a first biasing means engaging said primary piston to load the piston, secondary piston means coupled to the system and a second biasing means engaging said secondary piston and of lesser degree than the first biasing means, said second biasing means being normally maintained compressed by the initial pressure within the closed system to load the secondary piston so that the second biasing means will only move the secondary piston if the pressure in the system falls below a predetermined amount.

2. In a closed fluid system having initial pressure for providing backing pressure for movable electrodes mounted to contact said closed fluid and to which external pressure is periodically applied, a first piston means connected to the system, compressive means engaging said first piston to load the piston to provide initial pressure and against which the fluid may press on displacement in a part of the system, a second piston means connected to the system, a second compressive means engaging said second piston and of lesser degree than the first compressive means, said second compressive means being normally maintained compressed by the initial pressure in the closed fluid system, said second compression means loading the second piston, an auxiliary supply of fluid and valving means mounted on said second piston and conductively connected to the auxiliary supply of fluid and closed fluid system so that the second piston may feed auxiliary fluid to the closed fluid system when the second piston is moved under the action of the second compressive means when the pressure in the system falls below a predetermined amount.

3. In a closed fluid system for providing backing pressure for welding electrodes to which external pressure is periodically applied, a hollow housing member connected to the system, a first piston mounted in said housing member, spring biasing means engaging the piston to compress the fluid in the system to a given pressure, means for varying the spring biasing means, a second piston relatively movably carried by the first, a second biasing means engaging said second piston and of lesser degree than the first spring biasing means to load the second piston, a supply of auxiliary fluid, cooperating conductive channel means in said pistons capable of coupling the auxiliary supply to the main system and forming at a certain relative position of the pistons an enclosure within which fluid is trapped and valving means in said channel means actuated by movement of the second piston to control the flow of trapped fluid from the enclosure into the main system.

4. In a closed fluid system in which a minimum pressure is maintained, means for periodically increasing said pressure to a higher value, injector means coupled to said system having a plurality of relatively movable members, spring biasing means of different strengths engaging with and biasing said movable members, a fluid reservoir connected to the injector, cooperating passageways in the movable members which are interconnected at certain relative positions of the members connected to the reservoir and to the closed system and which form closed compression chambers at other positions, and valving means mounted in the passageways to control the flow of fluid therethrough.

5. In a closed fluid system providing backing pressure for mechanically movable members connected to the system to which external pressure is applied and the movement of which varies the pressure in the closed system, a first movable piston mounted in contact with the fluid in the closed system, biasing means engaging said piston to urge the piston toward the fluid to provide an initial pressure in the system but allow the piston to move back in the event the pressure applied to the system from the external source becomes greater than the bias, a second piston mounted in contact with the fluid in the closed system, biasing means engaging the second piston of much less value than the first named biasing means and insufficient to hold the second piston against the initial pressure in the system so that the initial pressure may overcome the same, limiting stop means for the second piston, a reservoir containing replacement fluid connected to one of said pistons, said pistons having cooperating interconnecting passageways connected to said reservoir and to the closed fluid system forming an enclosure through relative motion of said pistons and causing the injection of fluid from the reservoir into the closed fluid supply on further relative motion.

6. In a closed fluid system for providing backing pressure for movable welding electrodes to which external pressure is periodically applied, a housing connected to said system, a first piston mounted for reciprocation in the housing and contacting the fluid in the system, compressive means under pressure in the housing contacting the piston to urge it toward the fluid in the closed fluid system to provide initial pressure, a second piston mounted for reciprocation in the housing and engaging the fluid, biasing means engaging said second piston to urge it toward said fluid, said second piston having a hollow chamber therein, a supply of auxiliary fluid within said housing, interconnecting passageways in said housing and said second piston so that auxiliary fluid may flow to the hollow chamber, one-way valve means mounted in the passageway in the housing to control said fluid flow, and means for ejecting said auxiliary fluid in said hollow chamber into the closed fluid system upon movement of the second piston means due to its biasing means.

7. In a closed fluid system for providing backing pressure for movable welding electrodes to which external pressure is periodically applied, a housing connected to said system, a first piston mounted for reciprocation in the housing and contacting the fluid in the system, compressive means under pressure in the housing contacting the piston to urge it toward the fluid in the closed fluid system to provide initial pressure, a second piston mounted for reciprocation in the housing and engaging the fluid, biasing means engaging said second piston to urge it toward said fluid, said second piston havng a hollow chamber therein, a supply of auxiliary fluid within said housing, interconnecting passageways in said housing and said second piston so that auxiliary fluid may flow to the hollow chamber, one-way valve means mounted in the passageway in the housing to control said fluid flow, a central passageway in said second piston connecting said hollow chamber with the inner end of the piston, check valve means at each end of said central passageway to control the flow of the auxiliary fluid from the hollow chamber to the closed system, said housing having an enlarged circular groove adjacent the side of the second piston, an enlarged section on said piston moving adjacent said groove and forming therewith a pumping section and a channel in said piston connecting the central passageway to the periphery of the piston adjacent the enlarged section to provide a pumping action for ejection of fluid into the closed system.

8. In a closed fluid system having normal initial pressure at rest, said system providing backing pressure for clamping machine electrodes which are connected to said closed system and having a position of rest when in unclamped position and said normal pressure is applied and which are forced inwardly against said normal pressure periodically by the application of work to the electrodes, primary movable piston means having a surface engaging said closed fluid system, a first biasing means engaging said primary piston to force it against the fluid pressure in the closed fluid system to permit fluid movement but maintain fluid pressure, secondary movable piston means having a surface engaging said closed fluid system, a second biasing means engaging said second piston means and forcing it against the fluid in the closed system, said second biasing means being of such value as to be incapable of moving the second movable piston as long as the pressure in the closed fluid system exceeds said normal pressure but moving said second piston if the pressure falls therebelow at any time.

References Cited in the file of this patent

UNITED STATES PATENTS

| | | |
|---|---|---|
| 1,881,185 | Hazelton | Oct. 4, 1932 |
| 2,018,912 | Carroll | Oct. 29, 1935 |
| 2,041,476 | La Brie | May 19, 1936 |
| 2,109,114 | Kerr | Feb. 22, 1938 |
| 2,148,727 | Carroll | Feb. 28, 1939 |
| 2,150,617 | Weihe | Mar. 14, 1939 |
| 2,312,337 | Hughes | Mar. 2, 1943 |
| 2,323,770 | Hazelton | July 6, 1943 |
| 2,348,323 | Binder | May 9, 1944 |
| 2,447,173 | Gordon | Aug. 17, 1948 |
| 2,597,404 | Teske | May 20, 1952 |
| 2,605,716 | Huber | Aug. 5, 1952 |
| 2,620,629 | Gauldie | Dec. 9, 1952 |